United States Patent
Hashimoto

(10) Patent No.: US 6,553,070 B2
(45) Date of Patent: Apr. 22, 2003

(54) VIDEO-DATA ENCODER AND RECORDING MEDIA WHEREIN A VIDEO-DATA ENCODE PROGRAM IS RECORDED

(75) Inventor: Masahiro Hashimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/028,066

(22) Filed: Feb. 23, 1998

(65) Prior Publication Data

US 2001/0001613 A1 May 24, 2001

(30) Foreign Application Priority Data

Feb. 24, 1997 (JP) .............................................. 9-039079

(51) Int. Cl.⁷ ............................................... H04B 1/66
(52) U.S. Cl. ................................................. 375/240.18
(58) Field of Search ....................... 380/54, 5; 348/401, 348/403; 382/100, 232, 276; 375/240, 240.18, 240.12, 240.21; 235/493

(56) References Cited

U.S. PATENT DOCUMENTS

| | | | | |
|---|---|---|---|---|
| 5,410,351 A | * | 4/1995 | Kojima | 348/401 |
| 5,530,759 A | * | 6/1996 | Braudaway et al. | 380/54 |
| 5,809,139 A | * | 9/1998 | Girod et al. | 380/5 |
| 5,930,369 A | * | 7/1999 | Cox et al. | 380/54 |
| 5,960,081 A | * | 9/1999 | Vynne et al. | 380/54 |
| 6,024,287 A | * | 2/2000 | Takai et al. | 235/493 |
| 6,031,914 A | * | 2/2000 | Tewfik et al. | 380/54 |
| 6,037,984 A | * | 3/2000 | Isnardi et al. | 375/240.21 |
| 6,246,802 B1 | * | 6/2001 | Fujihara et al. | 382/276 |

FOREIGN PATENT DOCUMENTS

| | | |
|---|---|---|
| DE | 4430864 | 3/1996 |
| JP | 8-241403 | 9/1996 |

OTHER PUBLICATIONS

Hartung and Girod: "Digital watermaking of raw and compressed video", vol. 2952, 1996, pp. 205–213, especially p. 208, line 28–p. 209, line 19.

Hidenori Nakazawa, et al., "A Study of Digital Watermarking on MPEG2 Videos for Copyright Protection", paper No. SCIS 97–31D, Jan. 1997, collection of papers for the 1997 Coding and Information Security Symposium.

Hiroshi Ogawa, "A Copyright Information Embedding Method Using DCT for Digital Movies", paper No. SCIS 97–31G, Jan. 1997, collection of papers for the 1997 Coding and Information Security Symposium.

Adrian G. Bors et al, "Watermarking Using DCT Domain Constraints", Proceedings of 3rd IEEE International Conference on Image Processing, vol. 3, Sep. 16–19, 1996, pp. 231–234.

Frank Hartung et al, "digital Watermarking of Raw and Compressed Video", Proceedings of the Spie, vol 2952, 1996, pp. 205–213.

\* cited by examiner

*Primary Examiner*—Chris Kelley
*Assistant Examiner*—Allen Wong
(74) *Attorney, Agent, or Firm*—Foley & Lardner

(57) ABSTRACT

To provide an apparatus for embedding watermark data according to the frequency-domain method efficiently into video data, a video-data encoder of the invention for performing encoding of an original video data into a compressed data stream having a multi-layer structure comprises; means (101) for transforming the original video data into a sequence of processing units of frequency domain data; means (103) for embedding predetermined watermark data into at least one unit of the sequence of processing units; and means (104 and 105) for generating the compressed data stream by processing the sequence of processing units. Therefore, the data transformation of the original video data into the frequency domain data for embedding the water-mark data can be performed efficiently without any additional process, by exploiting the data transformation for encoding the original video data into the compressed data stream.

8 Claims, 5 Drawing Sheets

VIDEO-DATA ENCODER AND RECORDING MEDIA WHEREIN A VIDEO-DATA ENCODE PROGRAM IS RECORDED

BACKGROUND OF THE INVENTION

The present invention relates to modification of video data, and particularly to that for synthesizing identification data thereto for identifying the video data.

Illegal reproduction of digital video data is all actual problem. For preventing the illegal reproduction, there is proposed a playback system wherein digital video data are encoded into cipher data which can be played back only by video players equipped with a proper decipher key. However, even the ciphered video data, the illegal reproduction cannot be prevented once they are deciphered.

Hence, embedding special information into the digital video data themselves is attempted for preventing the illegal usage and reproduction. In the following paragraphs, data representing this special information will be called the electronic watermark data.

The electronic watermark data can be classified into two kinds, that is, visible electronic watermark data and invisible electronic watermark data.

An example of the visible electronic watermark data is disclosed in a Japanese patent application laid open as a Provisional Publication No. 241403/'96. In the example, for synthesizing the electronic watermark data into original picture data, the brightness values of original pixels data corresponding to opaque pixel of the electronic watermark are modified leaving color differential components thereof unchanged. When modifying the brightness values, a scaling factor to be applied for the modification may be determined according to a color component, random number, pixel value of the electronic water mark, or others.

Thus, the visible electronic watermark modifies a picture so that the modification may be sensed visually by comparing, or even without comparing, to its original, by synthesizing special characters or marks into the picture. Hence, the visible electronic watermark is effective in the prevention of illegal use to the observer. However, degradation of picture quality is, more or less, unavoidable.

On the other hand, the invisible electronic watermark is the watermark unable to be sensed visually, being embedded within image data and does not degrade the picture quality.

By embedding, into a video program, special information for identifying its licensee, for example, as the invisible electronic watermark, identification of the licensee becomes possible by extracting the watermark data from illegal copies of the video program. It becomes also possible, by embedding reproduction-prohibitive information in the program, to provide an alarm or restrict a user to make duplication by a VTR (Video Tape Recorder), by operating a copy prevention mechanism therein, for example, when the reproduction-prohibitive information is detected by the VTR.

The invisible electronic watermark data may be embedded into a part of image data which gives little affect to the picture quality, such as into LSB (Least Significant Bit) of each pixel value.

However, when the watermark is embedded into the LSB, it can be easily eliminated by way of a low-pass filter. Further, tie image data compression generally operates by reducing data amount by omitting data parts having little affect to the picture quality. That means the watermark embedded there is also eliminated by the image data compression.

As above described, there has been a tradeoff between the picture quality and the traceability of the watermark in the invisible electronic watermark.

For evading this tradeoff, a method of embedding the watermark data into frequency spectrum data of an image is proposed (in p. 13 of the NIKKEI ELECTRONICS, no. 660, Apr. 22, 1996). In this method, which will be called the frequency-domain method in the following paragraphs, being embedded into frequency components, the watermark data have sufficient durability to the image data processing such as data compression or filtering, and further, interference between different watermark data is also prevented, making it difficult to break the watermark data without giving serious affects throughout the picture.

In the frequency-domain method, the electronic watermark is embedded as follows, for example.

Original image data are transferred into frequency components by way of the DCT (Discrete Cosine Transform). Selecting n components $f(1), f(2), \ldots, f(n)$ each having higher n values among the frequency components thus obtained, an electronic watermark data set $w(1), w(2), \ldots, w(n)$ is prepared so as to accord to a normal distribution having a mean value 0 and a variance 1. Then, $F(i)=f(i)+\alpha |f(i)| \times w(i)$ is calculated for each i ($i=1, 2, \ldots, n$), $\alpha$ being a scale factor. From the frequency components wherein each $f(i)$ is replaced with $F(i)$, the image data including the electronic watermark are obtained.

For detecting the electronic watermark, following processes are performed, for example, on condition that the original image data and the probable watermark data set $w(i)$ ($i=1, 2, \ldots, n$) are known.

First, frequency components $F(1)$ to $F(n)$ corresponding to those $f(1)$ to $f(n)$ of the original image as above defined are extracted from image data wherein the electronic watermark is considered to be embedded. Then, each i-th component $W(i)$ of a probable data set vector $W=(W(1), W(2), \ldots W(n))$ is calculated as $W(i)=(F(i)-f(i))/f(i)$. When a static resemblance C of the probable data set vector W to the watermark data set vector $w=(w(1), w(2), \ldots, w(n))$ obtained from their normalized inner product represented by $C=W \cdot \omega/(|W| \cdot |\omega|)$ is larger than a certain value, the concerning electronic watermark is determined to be embedded in the object image data.

Thus, the author of the original image can effectively verify illegal copies by detecting the electronic watermark embedded by the frequency-domain method in the digital image data according to each licensee.

FIG. 6 is a block diagram illustrating a data modifier to be applied to the prior art for embedding the electronic watermark data by way of the frequency-domain method. Original image data 601 are converted into frequency components by a DCT processor 602, which are modified by a watermark embedder 603 according to a watermark data set 604 and converted by an inverse DCT processor 605 into time-domain data to be output as the watermarked image data 606.

It is proposed to apply the above frequency-domain method to MPEG (Moving Picture Expert Group) video data. FIG. 7 is a block diagram illustrating the basic configuration of a video-data encoder 700 for generating the MPEG video data, wherein are comprised a DCT processor 101 for converting an original video data stream 110 into frequency-domain data, a quantizer 104 for thinning out negligible data therefrom and a variable-length coder 105 for encoding the quantized data into the MPEG data stream 120. As can be seen from FIGS. 6 and 7, the DCT should be performed two times when the data modifier of FIG. 6 is directly applied in the video-data encoder 700 of FIG. 7. The encoding procedure of the video data into compressed data charges a heavy load to the encoder needing a large amount of operation. Therefore, operational load for embedding the electronic watermark is expected, without saying, to be as small as possible.

SUMMARY OF THE INVENTION

Therefore, a primary object of the present invention is to provide a method of and an apparatus for embedding watermark data according to the frequency-domain method efficiently into video data.

In order to achieve the object, a video-data encoder of the invention for performing encoding of an original video data into a compressed data stream having a multi-layer structure comprises;

means for transforming the original video data into a sequence of processing units of frequency domain data, said processing units being components of a predetermined layer of the multi-layer structure;

means for embedding predetermined watermark data into at least one unit of the sequence of processing units; and means for generating the compressed data stream by processing the sequence of processing units.

Therefore, the data transformation of the original video data into the frequency domain data for embedding the watermark data according to the frequency-domain method can be performed efficiently without any additional process, by exploiting the data transformation for encoding the original video data into the compressed data stream.

Further, in an embodiment of the invention, where the encoding is performed according to the MPEG standard, the watermark data are embedded into one or some of macro-blocks determined referring to a criterion defined in connection with anyone of a slice, a picture, a field, a frame, or a GOP.

Therefore, additional load of the video-data encoder for embedding the watermark data can be still suppressed.

BRIEF DESCRIPTION OF THE DRAWINGS

The foregoing, further objects, features, and advantages of this invention will become apparent from at consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
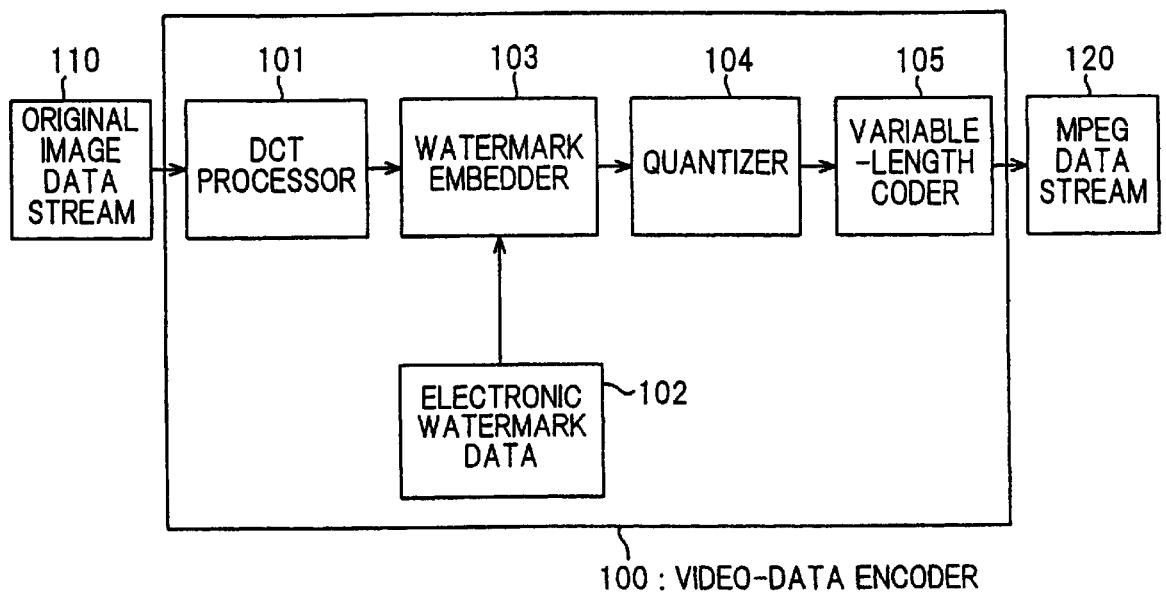
FIG. 1 is a block diagram illustrating a first embodiment of the invention.

FIG. 1 is a block diagram illustrating a first embodiment of the invention, wherein a video-data encoder 100 according to the embodiment comprises;

a DCT processor 101 for performing Discrete Cosine Transform of an original image data stream 110 wherein electronic watermark data 102 are to be embedded, a watermark embedder 103 for modifying output of the DCT processor 101 according to the electronic watermark data 102, a quantizer 104 for thinning out negligible data from output of the watermark embedder 103, and a variable-length coder 105 for generating variable-length code data from output of the quantizer 104 to be output as an MPEG data stream 120.

Figure 2:
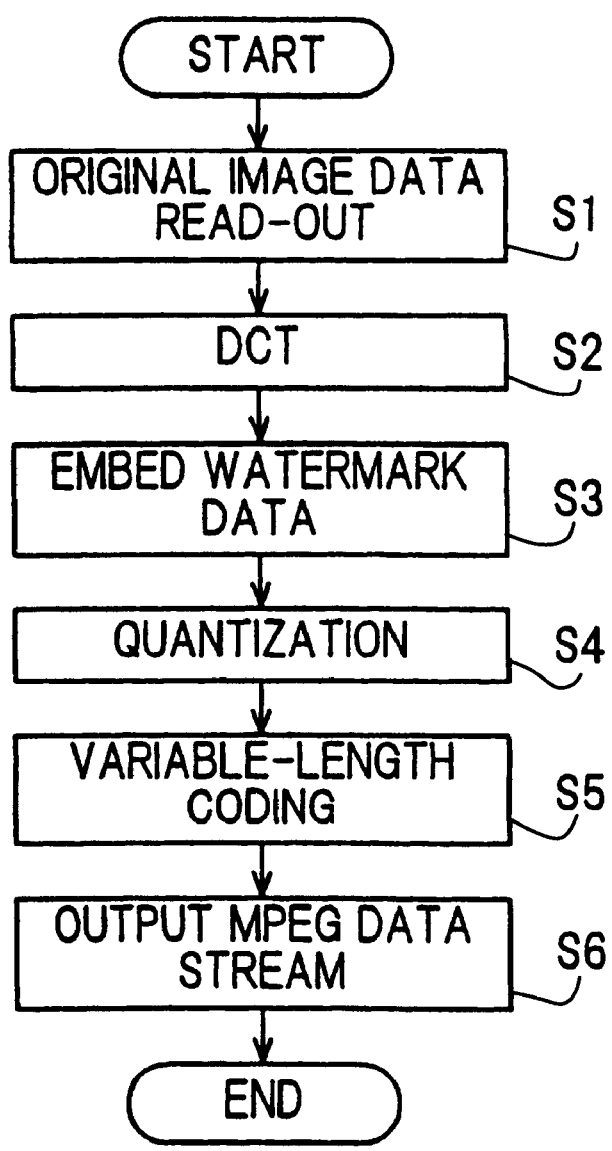
FIG. 2 is a flowchart illustrating operational flow of the video-data encoder 100 of FIG. 1.

FIG. 2 is a flowchart illustrating operational flow of the video-data encoder 100.

Data of the original image data stream 110 are read out (at step S1) block by block (each having 8×8 pixels) and transformed into frequency-domain data by the DCT processor 101 (at step S2): Each time when data corresponding to a macro-block (having 16×16 pixels) are transformed, the electronic watermark data 102 are embedded into the macro-block (at step S3) by the watermark embedder 103 a described previously concerning the frequency-domain method. The macro-block modified with the electronic watermark data 102 is quantized by the quantizer 104 (at step S4), and coded into variable-length codes (at step S5) by the variable-length coder 105 to be output (at step S6) as the MPEG data stream 120.

Thus, the electronic watermark data 102 can be embedded into a video data without needing any additional DCT processing in the embodiment, exploiting the DCT process performed along with the MPEG encoding of the video data. Here, each of n components of data set w representing the electronic watermark data 102 is embedded into each of n largest frequency components of the frequency-domain data. Therefore, the electronic watermark data 102 are least affected by the quantization performed by the quantizer 104.

In the following paragraphs, a second embodiment of the invention will be described referring to FIGS. 3 to 5.

Figure 3:
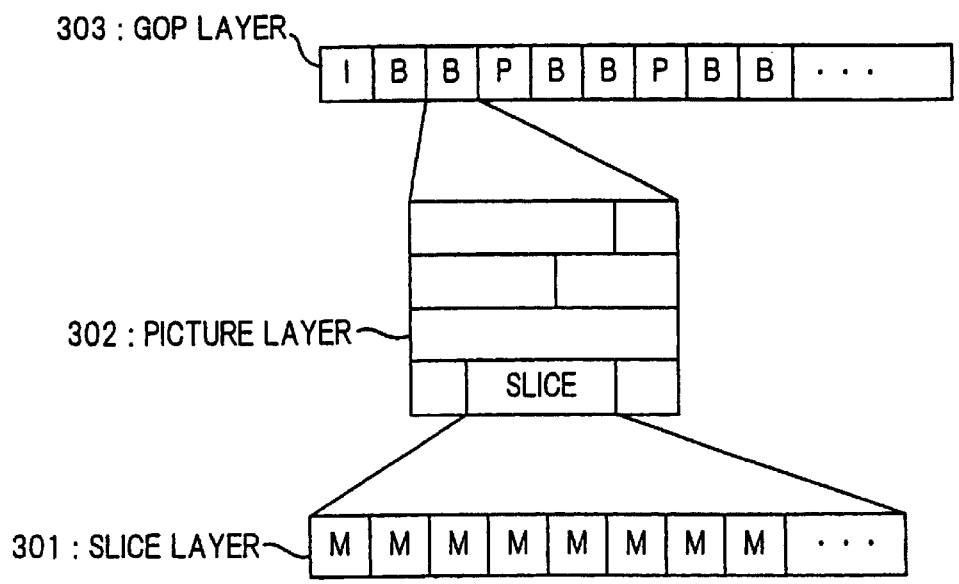
FIG. 3 shows a part of layer structure of the MPEG data.

FIG. 3 shows a part of layer structure of the MPEG data. A GOP (Group Of Pictures) layer 303 comprises picture layers I (Intra-picture), P (Predictive-picture) and B (Bidirectionally Predictive-picture). Each (302) of the picture layers comprises slice layers, each (301) consisting of the macro-blocks denoted by M. As for the pictures, fields or frames may be assigned.

In the first embodiment, the electronic watermark data 102 are embedded for every macro-block along with the MPEG encoding procedure. However, the total operational load is still considerably high since the MPEG encoding itself needs a large amount of operation. Therefore, the electronic watermark data 102 are embedded into one or some of macro-blocks of every slice layer in the second embodiment, for lightening the operational load of the MPEG encoding procedure including embedding the electronic watermark data 102.

Figure 4:
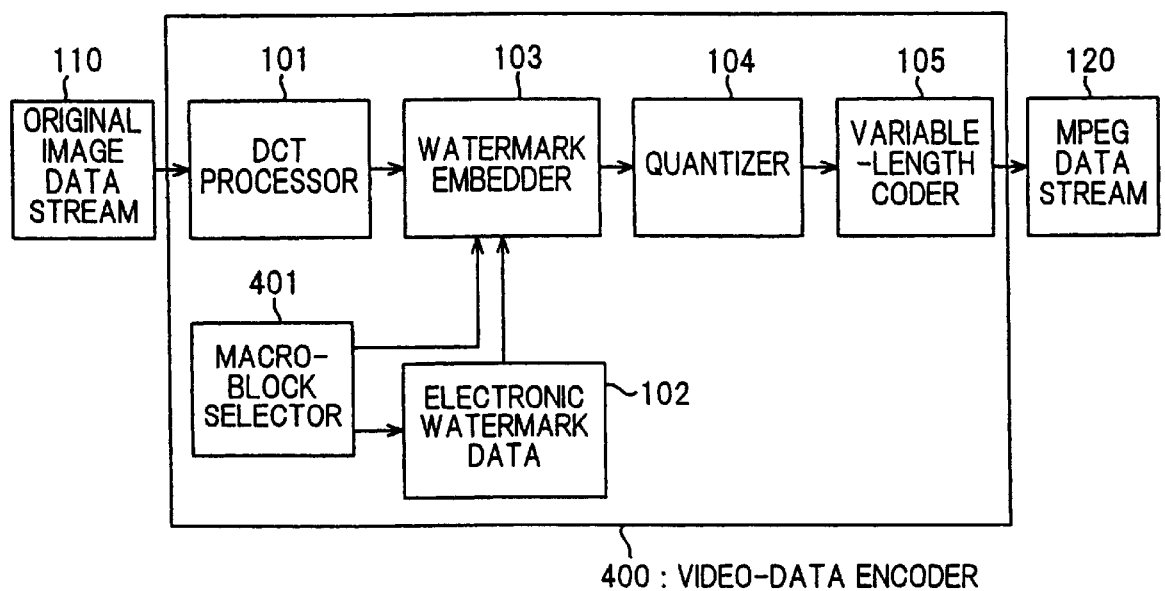
FIG. 4 is a block diagram illustrating configuration of a video-data encoder 400 according to a second embodiment of the invention.
Figure 5:
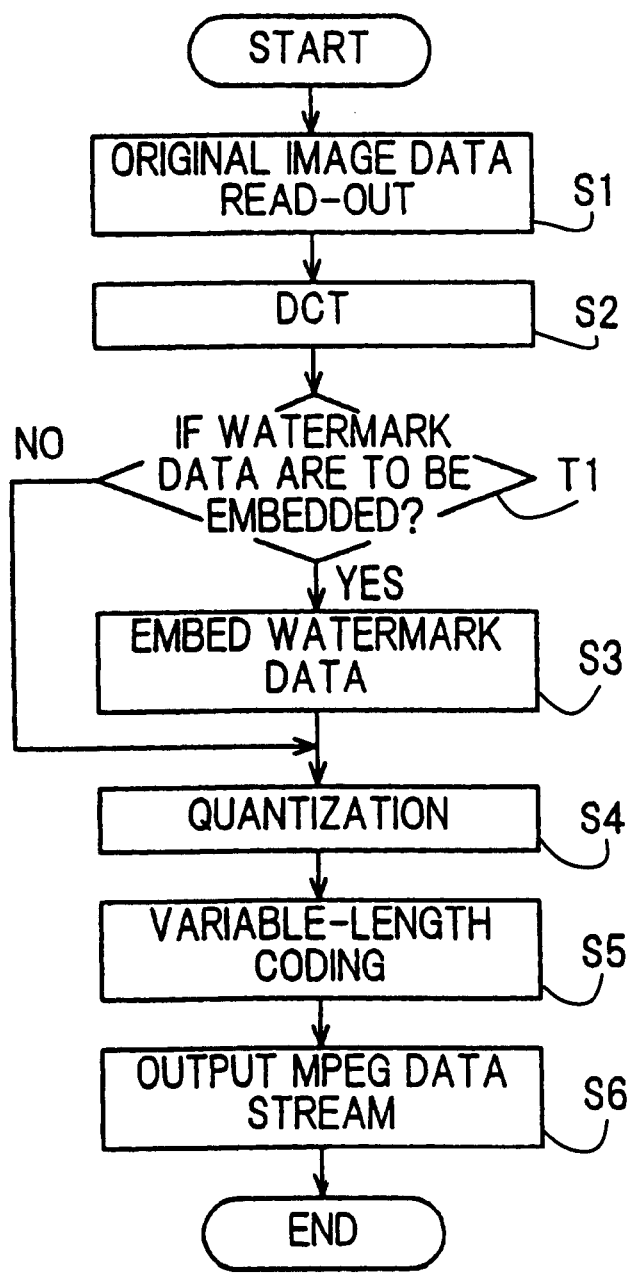
FIG. 5 is a flowchart illustrating operational flow of the video-data encoder 400.
Figure 6:
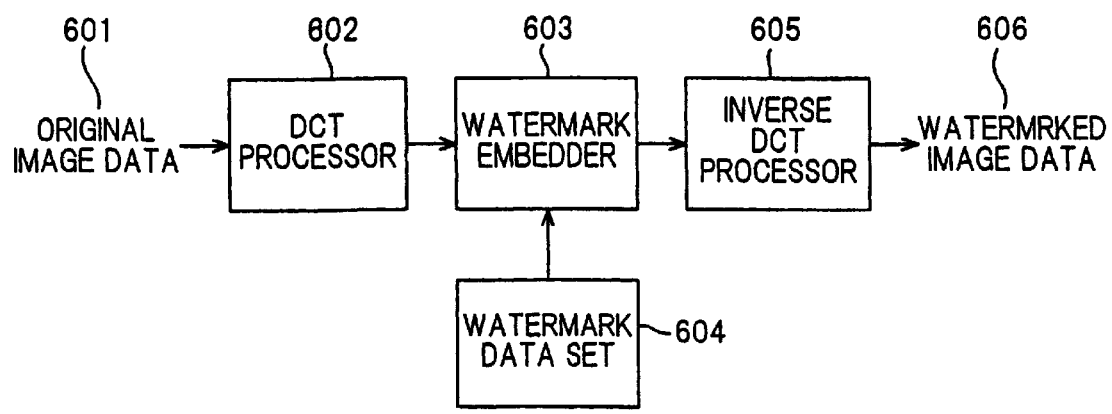
FIG. 6 is a block diagram illustrating a data modifier to be applied to a prior art for embedding the electronic watermark by way of the frequency-domain method.
Figure 7:
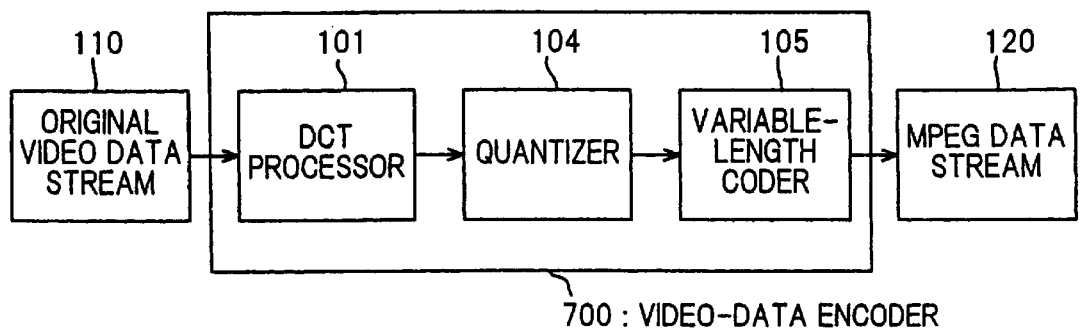
FIG. 7 is a block diagram illustrating basic configuration of a video-data encoder 700 for generating the MPEG data.

FIG. 4 is a block diagram illustrating configuration of a video-data encoder 400 according to the second embodiment, wherein a macro-block selector 401 is further utilized in addition to the video-data encoder 100 of FIG. 1. Operation of the video-encoder 400 is illustrated by a flowchart of FIG. 5.

At steps S1 and S2, the original image data stream 110 is transformed block by block into frequency-domain data, in the same way in the first embodiment. When the watermark embedder 103 receives a macro-block, the macro-block selector 401 indicates whether the watermark embedder 103 should or should not embed the electronic watermark data 102 into concerning macro-block (at step T1), referring to a criterion predetermined for a slice layer, in the second embodiment. Into the macro-blocks indicated to embed the electronic watermark data 102, the electronic watermark data 102 are embedded (at step S3) by the watermark embedder 103, other macro-blocks being output as they are. The output of the watermark embedder 103 is quantized (at step S4) by the quantizer 104, and coded into variable-length codes (at step S5) by the variable-length coder 105 in the same way with the first embodiment for generating the MPEG data stream 120 (at step S6).

Thus, the operational load of the MPEG encoding procedure including embedding the electronic watermark data 102 can be lightened still more than the first embodiment by limiting the number of macro-blocks in a slice layer wherein the electronic watermark data 102 are embedded, in the second embodiment.

Heretofore, the present invention is described in connection with the above two embodiment. However, it can be easily understood that various applications can be considered in the scope of the present invention. For example, the criterion for selecting the macro-block to embed the electronic watermark data 102 is described to be determined for a slice layer. However the criterion may be defined in connection with a picture, a field, a frame, or a GOP, in the scope of the invention.

Furthermore, it can be also understood that the embodiments of the invention can be easily implemented by way of a computer with a program prepared in data-recording media.

What is claimed is:

1. A computer readable medium storing a program for implementing encoding of an original video data stream by way of a computer into a variable length encoded data stream having a multi-layer structure and having electronic watermark data embedded therein, said encoding comprising steps of:

storing a predetermined electronic watermark data set comprising watermark data w(1) . . . w(n) in a main memory of the computer;

frequency domain transforming the original video data into a sequence of processing units of frequency domain data, said processing units being components of a predetermined layer of the multi-layer structure;

embedding the predetermined watermark data into at least one unit of the sequence of processing units, wherein said embedding comprises:

selecting components f(1) . . . f(n) from among frequency components of said at least one unit of said sequence of processing units; and replacing each of said components f(1) . . . f(n) with corresponding components F(1) . . . F(n), wherein each of said corresponding components F(n) is a function of a corresponding frequency component f(n) and a corresponding watermark data w(n);

quantizing the sequence of processing units having the electronic watermark data embedded therein; and variable length coding the sequence of quantized processing units having the electronic watermark data embedded therein.

2. The computer readable medium recited in claim 1, wherein said embedding is performed selectively on processing units in accordance with a predetermined criterion.

3. The computer readable medium of recited in claim 1, wherein:

said encoding is performed according to an MPEG (Moving Picture Expert Group) standard; and said sequence of processing units is a sequence of macro-blocks defined in the MPEG standard.

4. The computer readable medium recited in claim 2, wherein:

said encoding is performed according to an MPEG standard;

said sequence of processing units is a sequence of macro-blocks defined in the MPEG standard; and said predetermined criterion is defined in connection with one of a slice, a picture, a field, a frame, and a GOP (Group of Picture) of the multi-layer structure.

5. A video-data encoder for performing encoding of an original video data stream into a variable length encoded data stream having a multi-layer structure and having electronic watermark data embedded therein, said video-data encoder comprising;

means for frequency domain transforming the original video data into a sequence of processing units of frequency domain data, said processing units being components of a predetermined layer of the multi-layer structure;

means for embedding predetermined watermark data of a watermark data set w(1) . . . w(n) into at least one unit of the sequence of processing units, said embedding comprising:

selecting components f(1) . . . f(n) from among frequency components of said at least one unit of said sequence of processing units; and replacing each of said components f(1) . . . f(n) with corresponding components F(1) . . . F(n), wherein each of said corresponding components F(n) is a function of a corresponding frequency component f(n) and a corresponding watermark data w(n);

means for quantizing the sequence of processing units having the electronic watermark data embedded therein; and means for variable length coding the sequence of quantized processing units having the electronic watermark data embedded therein.

6. The video data encoder recited in claim 5, wherein said means for embedding selectively performs embedding on processing units in accordance with a predetermined criterion.

7. The video data encoder recited in claim 5, wherein:

said encoding is performed according to an MPEG (Moving Picture Expert Group) standard; and said sequence of processing units is a sequence of macro-blocks defined in the MPEG standard.

8. The video-data encoder recited in claim 6, wherein:

said encoding is performed according to an MPEG standard;

said sequence of processing units is a sequence of macro-blocks defined in the MPEG standard; and said predetermined criterion is defined in connection with one of a slice, a picture, a field, a frame, and a GOP (Group of Picture) of the multi-layer structure.

* * * * *